United States Patent
Bowe

(10) Patent No.: US 7,073,532 B2
(45) Date of Patent: Jul. 11, 2006

(54) VALVE ASSEMBLY

(75) Inventor: Michael Joseph Bowe, Preston (GB)

(73) Assignee: Accentus PLC, Didcot (GB)

( * ) Notice: Subject to any disclaimer, the term of this patent is extended or adjusted under 35 U.S.C. 154(b) by 61 days.

(21) Appl. No.: 10/519,195

(22) PCT Filed: May 22, 2003

(86) PCT No.: PCT/GB03/02239

§ 371 (c)(1),
(2), (4) Date: Dec. 23, 2004

(87) PCT Pub. No.: WO04/001260

PCT Pub. Date: Dec. 31, 2003

(65) Prior Publication Data

US 2006/0076065 A1     Apr. 13, 2006

(30) Foreign Application Priority Data

Jun. 25, 2002   (GB) ................................. 0214597.7

(51) Int. Cl.
*F16K 11/06*     (2006.01)
(52) U.S. Cl. .................................................. 137/625.33
(58) Field of Classification Search ............. 137/625.3, 137/625.33
See application file for complete search history.

(56) References Cited

U.S. PATENT DOCUMENTS

| | | | | |
|---|---|---|---|---|
| 3,025,880 A | * | 3/1962 | Anderson ............... | 137/625.33 |
| 3,674,044 A | | 7/1972 | Mayer ....................... | 137/81.5 |
| 3,990,475 A | | 11/1976 | Myers ...................... | 137/625.3 |
| 4,041,982 A | * | 8/1977 | Lindner .................... | 137/625.3 |
| 4,397,331 A | | 8/1983 | Medlar ....................... | 137/375 |
| 4,471,810 A | * | 9/1984 | Muchow et al. ........ | 137/625.37 |
| 5,133,383 A | * | 7/1992 | King ........................ | 137/625.3 |

FOREIGN PATENT DOCUMENTS

| | | |
|---|---|---|
| EP | 0530967 | 3/1993 |
| FR | 778928 | 3/1935 |
| GB | 2209411 | 5/1989 |

* cited by examiner

*Primary Examiner*—John Fox
(74) *Attorney, Agent, or Firm*—William H. Holt

(57) ABSTRACT

A valve assembly (10) comprises a valve stem (14) with a bore (15) and radial apertures (17), and a sleeve (18) closed at one end and slidable over the valve stem (14) to obstruct the apertures (17). At the end of the valve stem opposite the outlet end, the valve stem (14) defines a fluidic vortex chamber (22) with both tangential inlets (28) and non-tangential peripheral inlets (26), and with an axial outlet (24) communicating with the bore (15). The sleeve (18) defines at least one radial port (32) near its closed end. The valve assembly operates in a conventional fashion except when approaching closure. Once the last of the apertures (17) in the valve stem has been closed, the only flow path is through the fluidic vortex chamber (22). Further movement of the sleeve (18) alters the distribution of the flow between the non-tangential inlets (26) and the tangential inlets (28), so adjusting the strength of the fluidic vortex and the resistance to fluid flow. The valve assembly (10) suppresses erosive and cavitational wear of the valve mechanism, and can provide a wide range of flow modulation.

7 Claims, 1 Drawing Sheet

VALVE ASSEMBLY

The present invention relates to a valve assembly that may be used to control a flow of a fluid, and that resists damage from erosion or cavitation, and to a use of it.

The use of a purely mechanical valve in which a valve member seals against a valve seat is very widely known, and can be used either to adjust the flow of a fluid or to close off the flow altogether. Such a valve is not entirely suitable for use in controlling flows of potentially abrasive fluids, for example the liquids emerging from an oil well that may contain sand particles, as the particulate material will cause abrasion of the valve surfaces especially when the valve is almost closed. Fluid flows can also be controlled, as described in GB 2 209 411, by a fluidic vortex valve or vortex amplifier, in which the main flow enters a vortex chamber radially and leaves the chamber axially, and a flow of liquid is supplied to a tangential inlet by a suitable pump; the magnitude of the tangential flow has a very large effect on the main flow, as it generates a vortex in the chamber. Such a fluidic vortex amplifier can be used as a choke valve, and has the benefit that it suffers much less from abrasion. However a fluidic vortex amplifier must always have fluid emerging from it, since if the main flow is to be effectively shut off then the flow of the control fluid must be at its maximum.

According to the present invention there is provided a valve assembly comprising a valve stem defining a bore and at least one radial port, and having an outlet end, and a sleeve closed at one end slidable over the valve stem to obstruct the or each radial port in the valve stem, wherein the valve stem at the end opposite the outlet end defines a fluidic vortex chamber having at least one generally tangential inlet and at least one non-tangential peripheral inlet and having an axial outlet communicating with the bore, and the sleeve defines at least one port near the closed end of the sleeve.

The valve assembly operates in a conventional fashion except when approaching closure. Once the last of the radial ports in the valve stem has been closed, the only flow path is through the radial port in the sleeve, and hence through the fluidic vortex chamber. Initially the flow is primarily through the non-tangential peripheral inlet or inlets, but on further closure of the valve the radial port in the sleeve aligns with the tangential inlet to the fluidic vortex chamber, so a fluidic vortex is generated and the resistance to fluid flow is increased. In the final approach to closure, substantially all the fluid flow must pass through the tangential inlet or inlets, the resulting vortex maximizing the pressure drop but minimizing the erosion of the surfaces. Finally the flow is stopped altogether as the valve stem obstructs the radial port in the sleeve.

The erosive and cavitational wear on the mechanical valve mechanism is significantly reduced as compared to conventional choke valves, particularly at the low flow/high pressure drop conditions in which erosion is most severe. A wide range of flow modulation can be achieved with limited movement of the mechanical valve member, as closure is approached.

Preferably there are a plurality of non-tangential peripheral inlets that communicate with the end face of the valve stem. Preferably there are also a plurality of tangential inlets, and these are preferably linked by a peripheral groove on the outer surface of the valve stem. There may also be a plurality of radial inlets through the sleeve, lying in a common radial plane.

Thus the vortex chamber provides the flow path for the bulk of the fluid only when the valve assembly is almost closed, that is to say only at very low flow rates through the valve assembly. In contrast, when the valve assembly is fully open, substantially all the fluid passing through the valve assembly bypasses the vortex chamber. However, when the valve assembly is almost closed, the vortex chamber provides the flow path and also the bulk of the pressure drop across the valve assembly.

The invention will now be further and more particularly described, by way of example only, and with reference to the accompanying drawings in which.

Figure 1:
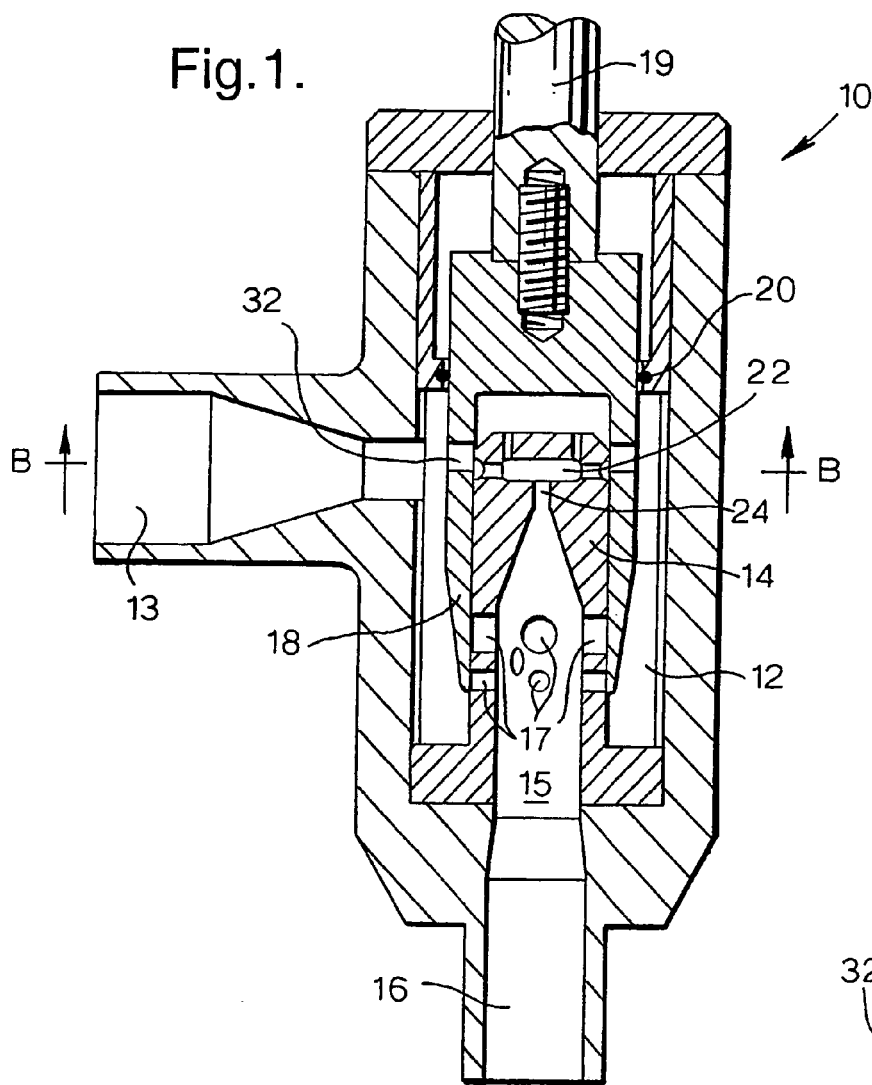
FIG. 1 shows a cross-sectional view through a valve assembly.

Referring to FIG. 1, a valve assembly 10 comprises a valve chamber 12 of substantially cylindrical shape and which communicates on one side with an inlet supply port 13 for a fluid flow to be controlled. A tubular valve stem 14 projects from one end wall of the valve chamber 12, and its bore 15 communicates with an outlet duct 16; the valve stem 14 defines a plurality of radial apertures 17 through its walls. A valve sleeve 18 closed at its top end (as shown) fits over the valve stem 14 and can be moved axially by an actuator (not shown) by means of a valve stem 19, passing through a seal 20 at the other end wall of the valve chamber 12. Movement of the valve stem 19 consequently controls the degree to which the apertures 17 are obstructed, and so controls the flow of the fluid passing between the inlet 13 and the outlet duct 16. These features are substantially conventional.

Figure 1A:
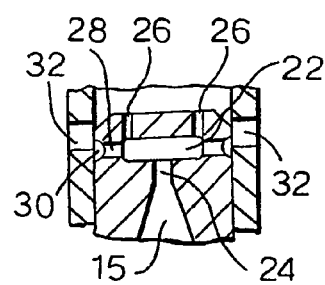
FIG. 1a shows a fragmentary view of part of the assembly of FIG. 1.
Figure 2:
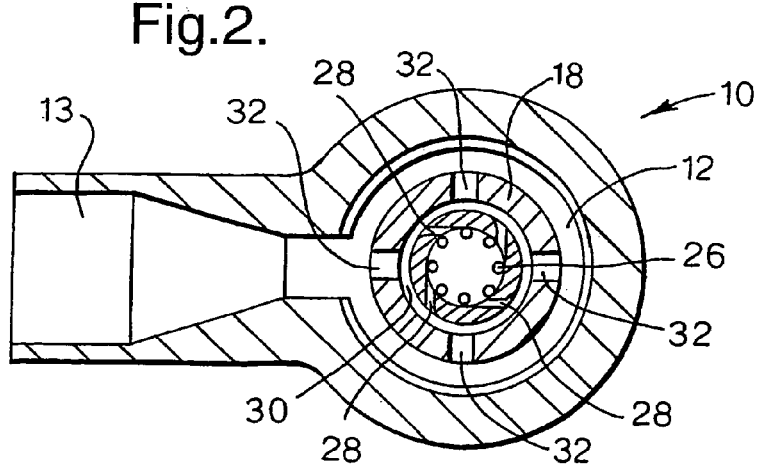
FIG. 2 shows a sectional view on the line B—B of FIG. 1.

Towards its top end (as shown) the bore 15 tapers; the valve stem 14 is almost closed at the top end, but defines a fluidic vortex chamber 22 with an axial outlet 24 communicating with the bore 15. Referring also to FIGS. 1a and 2, there are eight narrow inlet ports 26 extending parallel to the longitudinal axis and equally spaced around the periphery of the chamber 22, providing fluid communication between the top end of the valve stem 14 and the periphery of the chamber 22. There are also four tangential inlets ports 28 extending in a radial plane from the periphery of the vortex chamber 22, and at their outer ends communicating with a groove 30 around the outside of the valve stem 14. The ports 28 are shown diagrammatically in FIG. 1; their orientation is shown more precisely in FIG. 2. The top end of the valve stem 14 is chamfered around its edge.

The sleeve 18 defines four radial apertures 32 a short distance below the closed end. The radial apertures 32 are located such that as the sleeve 18 is lowered, the apertures 32 start to communicate with the circumferential groove 30 just as the last radial apertures 17 is closed. As shown in FIGS. 1 and 1a, the apertures 32 are wide enough to communicate both with the groove 30 and also with the space above the top end of the valve stem 14 (because of the chamfer). If the sleeve 18 is lowered to its fullest extent, flow is completely stopped because the apertures 32 are obstructed by the portion of the valve stem 14 below the circumferential groove 30.

Hence in use the valve assembly 10 operates in a conventional fashion except when approaching closure. As the sleeve 18 is lowered, it gradually obstructs the apertures 17 (which in this example are of progressively smaller diameters), so gradually restricting the fluid flow. When the valve sleeve 18 reaches the position shown in FIG. 1 the only flow path is through the radial apertures 32, and then through the fluidic vortex chamber 22, leaving through the axial port 24 and so into the bore 15. In this position the flow is primarily through the space above the valve stem 14 and through the inlets 26, but on further lowering of the sleeve 18 the apertures 32 align with the groove 30 so that a greater proportion of the flow is through the tangential inlets 28. A fluidic vortex is therefore generated in the vortex chamber 22 and the resistance to fluid flow increases. On still further movement of the sleeve 18, fluid access to the space above the valve stem 14 is completely obstructed so all the fluid flow must pass through the tangential inlets 28, the resulting vortex in the chamber 22 maximizing the pressure drop across the assembly 10 but minimizing the erosion of the surfaces. Finally the flow is stopped altogether as the apertures 32 are blocked by the wall of the stem 14 below the groove 30.

Thus as the valve assembly 10 approaches closure, a progressively greater proportion of the overall pressure drop is due to the fluidic vortex rather than to the mechanical valve components.

The invention claimed is:

1. A valve assembly comprising a valve stem defining a bore and at least one radial port, and having an outlet end, and a sleeve closed at one end slidable over the valve stem to obstruct the or each radial port in the valve stem, characterised in that the valve stem at the end opposite the outlet end defines a fluidic vortex chamber having at least one generally tangential inlet and at least one non-tangential peripheral inlet and having an axial outlet communicating with the bore, and the sleeve defines at least one port near the closed end of the sleeve.

2. A valve assembly as claimed in claim 1 in which there are a plurality of non-tangential peripheral inlets that communicate with the end face of the valve stem.

3. A valve assembly as claimed in claim 2 wherein the non-tangential peripheral inlets extend parallel to the longitudinal axis of the valve stem.

4. A valve assembly as claimed in claim 1 also defining a plurality of tangential inlets.

5. A valve assembly as claimed in claim 4 wherein the tangential inlets are linked by a groove.

6. A valve assembly as claimed in claim 5 wherein the groove is peripheral groove around the outside of the valve stem.

7. A valve assembly as claimed in claim 2 also defining a plurality of tangential inlets.

* * * * *